Dec. 17, 1940.  R. J. STEWART ET AL  2,225,022
FILLING MACHINE
Filed Dec. 17, 1936   3 Sheets-Sheet 2
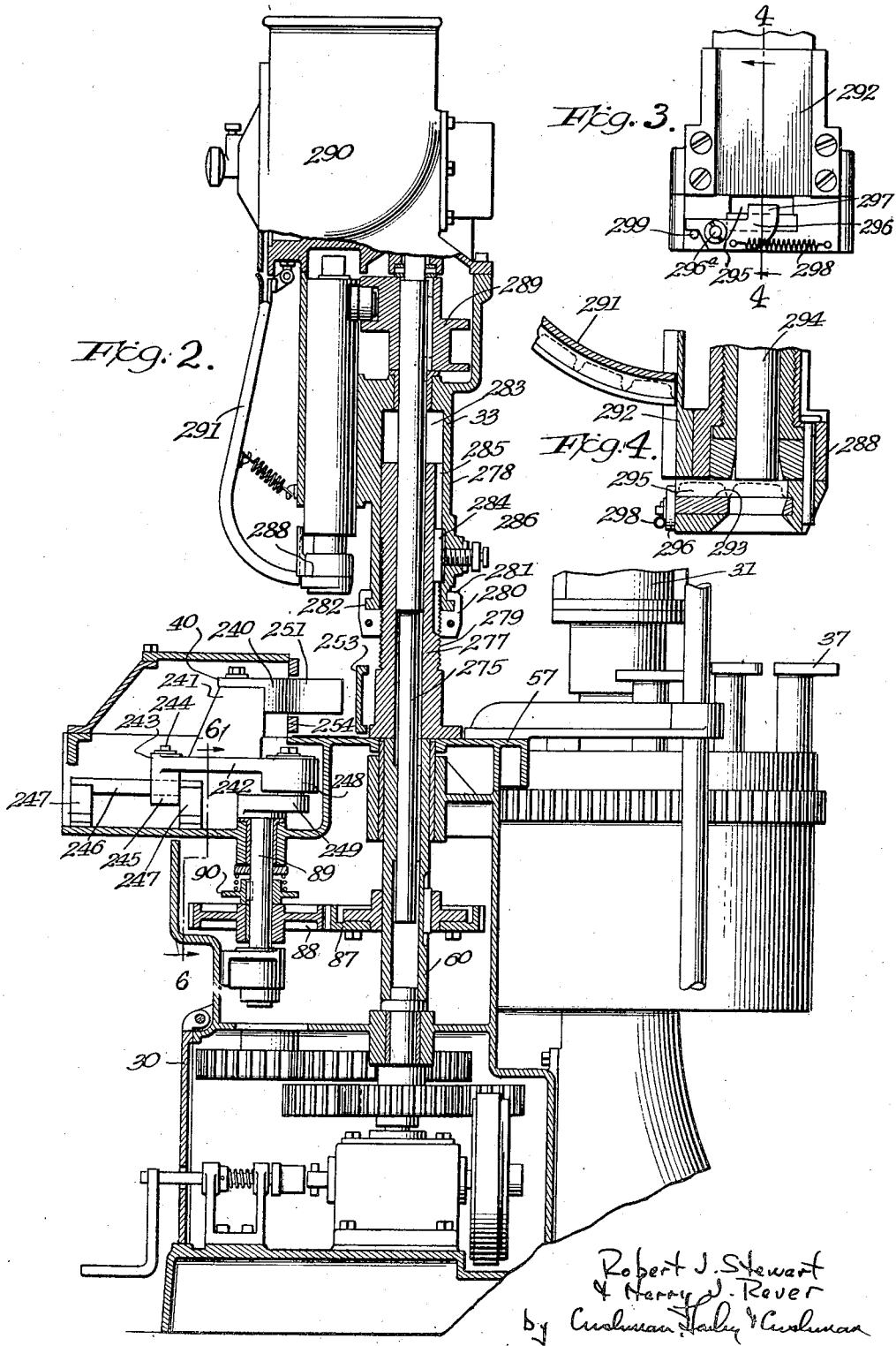

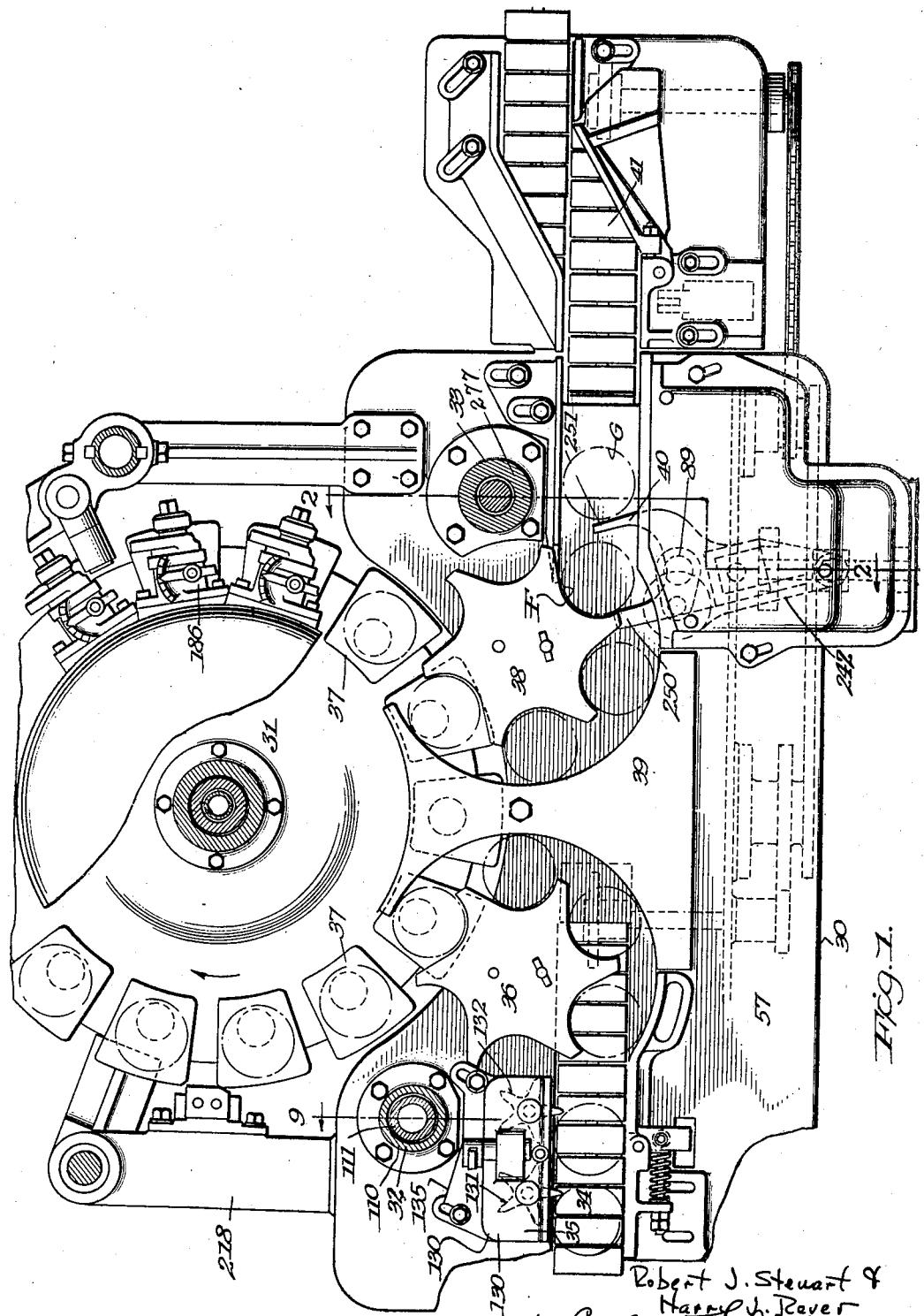

Dec. 17, 1940.   R. J. STEWART ET AL   2,225,022
FILLING MACHINE
Filed Dec. 17, 1936   3 Sheets-Sheet 3

Robert J. Stewart
& Harry J. Rever

Patented Dec. 17, 1940

2,225,022

UNITED STATES PATENT OFFICE 2,225,022

FILLING MACHINE

Robert J. Stewart and Harry J. Rever, Baltimore, Md., assignors to Crown Cork & Seal Company, Inc., Baltimore, Md., a corporation of New York Application December 17, 1936, Serial No. 116,426

9 Claims. (Cl. 226—84)

The present invention relates to filling machines.

In filling machines it is desirable that the bottles or other containers shall be so moved that their linear speed will not be suddenly varied nor their direction of movement sharply changed. Any sudden change of speed or any quick stopping or starting, or any sharp change of direction, may result in foaming of liquid contents of the containers. Also, such changes in speed cause sudden contact of one bottle with another or permit moving elements of the machine to sharply contact with the bottles, resulting in chipping and breakage.

An important object of the invention is the provision of means to intermittently present bottles to a head which will perform an operation on the bottle, and which means will hold the bottle momentarily stationary beneath such a head and then move the bottle from beneath the head, all without undue jarring of the bottle.

The construction referred to in the object set forth above, as applied to the crowning mechanism of a filling machine, comprises a member having a continuous movement in an orbital path to present to the crowning head bottles moving from the outgoing curvilinear portion of their path of travel. The crowning head operates above the portion of the stationary table adjacent the inner end of the outfeed straight line conveyor, and the positioning mechanism stops each bottle momentarily beneath the crowning head and then subsequently moves it from beneath the crowning head to position it upon the outfeed straight line conveyor. The bottle positioning member cooperates with stationary guide devices to direct the bottle along the desired path and the movement of the positioning member is so controlled that the filled bottles will be stopped beneath the crowning head and then started for their movement from beneath this head by a gradual movement, so that the bottle contents will not be jarred.

Another object of the invention is to provide means to stop operation of a filling machine in the event that a bottle is broken during passage therethrough.

With reference to the machine of the present application, the stopping means is used in connection with the mechanism for positioning bottles beneath the crowning head. Because of flaws in their glass, bottles are occasionally broken during the operation of any crowning mechanism and if large sections of a broken bottle remain beneath the crowning head, the succeeding bottle moved beneath the head by the crowner positioning means may be upset upon coming into contact with such large fragments. To overcome this difficulty, the crowner positioning means is provided with means to cause operation of the entire machine to be stopped when its forwarding movement of a bottle is impeded, as would be the case when a bottle comes into contact with a large fragment of a broken bottle.

A further object of the invention is to provide means for retaining crowns in the crowning chamber of a reciprocable crowning head.

Crowns are ordinarily fed to the crowning chambers of a reciprocable crowning head from the stationary chute of the crown hopper, by movement of a crown from the chute to the crowning chamber at the moment when the chute is aligned with an open passage into the head and leading to the crowning chamber. Obviously, when the crowning head is not opposite the chute, the outer end of the passage within its head is open and the crown may fall therefrom, resulting in failure to crown the bottle subsequently presented beneath the head. By the present invention, a stop means is provided upon the head which will close the crowning head passage when the latter is not opposite the crowning chute, but which, upon contact with the crowning chute, will be moved to open the crowning passage.

Other objects and advantages of the invention will be apparent from the following specification and drawings, wherein:

Figure 1 is a plan view of the machine, portions being shown in horizontal section;

Figure 2 is a transverse vertical sectional view taken on the line 2—2 of Figure 1;

Figure 3 is a detail front elevation of the cap stop mechanism provided on the crowning head;

Figure 4 is a vertical sectional view taken on the line 4—4 of Figure 3;

Figure 5:
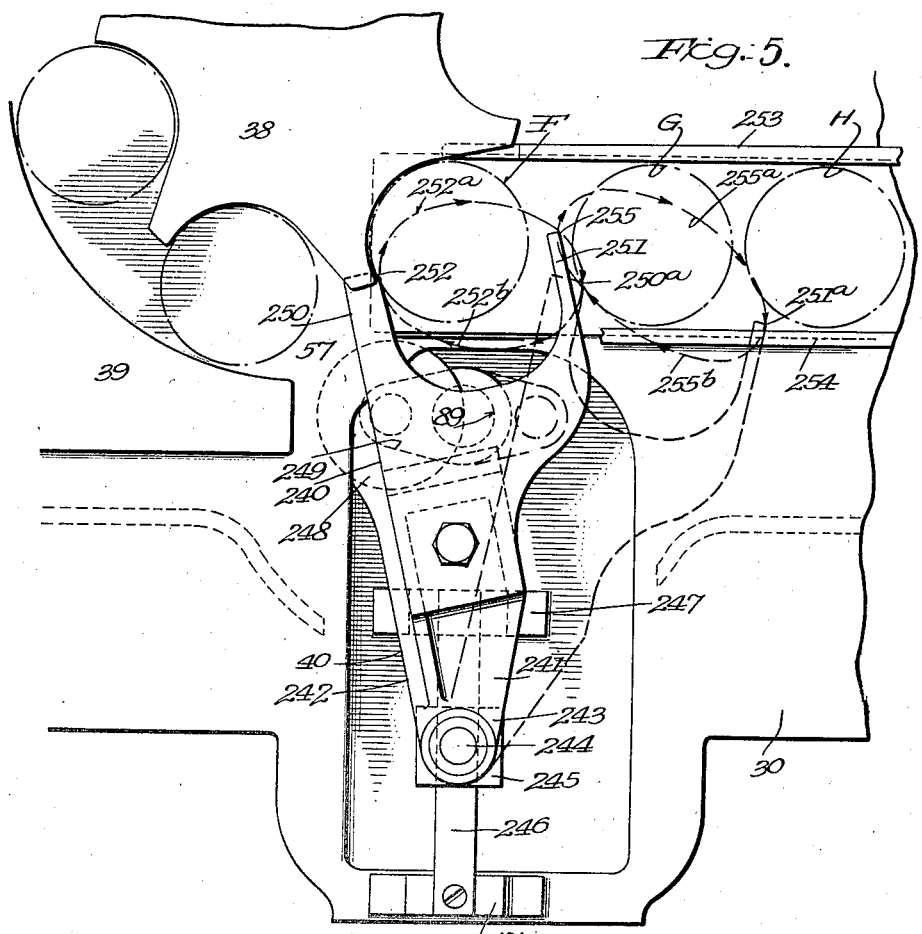
Figure 5 is a plan view of the container positioning means provided beneath the crowning mechanism.

The drawings illustrate the present invention applied to a filling machine of the type disclosed and claimed in our divisional application for Filling machine, filed May 6, 1940, Serial No. 333,700. However, it will be understood that the invention is applicable to various other types of machines. The operation of the entire filling machine and its general construction may be described as follows:

A stationary table 30 is provided which encloses the drive mechanism of the machine and which has a rotating filling mechanism 31 positioned adjacent its rear edge. Upon the infeed side of the stationary table, the left-hand side in Figure 1, there is positioned a syruping mechanism 32, and a crowning mechanism 33 is positioned adjacent the outfeed side of the table. Bottles or other containers are moved into the machine upon an infeed straight line conveyor 34 and each bottle is positioned or held stationary beneath the syruping mechanism or syruper 32 by a syruper positioning device 35, the infeed conveyor 34 continuing its movement beneath the bottle during the syruping. After the bottle has been syruped, it is released by the positioning device 35 and resumes movement with the conveyor, being removed from the latter by a rotary infeed dial 36 which places each bottle upon one of the bottle supporting platforms 37 of the filling mechanism 31. After the bottle has been filled, it is removed from the rotating filling mechanism by a rotary outfeed dial 38, its movement with this dial as well as with the infeed dial 36 being directed by a guide plate 39 positioned above the surface of the stationary table and having its edges formed to define a path of movement for the bottle. The bottles are removed from the outfeed dial 38 by a crowner positioning means 40 which moves each bottle beneath the crowning mechanism 33, the bottle remaining stationary in this position until it has been crowned, whereupon the positioning means 40 moves it upon or toward a straight line outfeed conveyor 41 which conducts the bottle from the machine.

The reservoir and filling valves are of substantially the same type as disclosed in the patent for Filling machine issued January 31, 1939, to George J. Huntley and Robert J. Stewart, No. 2,145,765.

Filled bottles or other containers are removed from the bottle supporting platforms 37 of the filling table by the cooperation of the outfeed spider 38 and the guide plate 39, the rotation of the spider 38 causing the bottles to slide upon the upper surface 57 of the stationary table 30 to the point indicated at F in Figures 1 and 5. From this position to the moment when the bottle is moved from beneath the crowning mechanism 33, its movement is controlled by the crowner positioning means 40.

The crowner positioning means 40 comprises a double armed pusher member 240 removably secured to an upstanding element 241 formed on a slide member 242 having its outer end 243 pivotally mounted at 244 on a collar 245 slidably mounted on a slide bar 246 supported upon fixed uprights 247. The inner end 248 of the slide member 242 is rotatably connected to a crank 249 secured to the rotatable shaft 89. By this arrangement, the bottle contacting arms 250 and 251 at the inner end of the pusher member 240 will follow orbital paths.

As the pusher member 240 moves from the solid line position shown in Figure 5 to the dotted line position of the same figure, the inner and bottle contacting point 252 of arm 250 will move along the curved dotted line 252a to the position shown in dotted lines at 250a. Because of this movement, the bottle at position F will be moved to position G, the movement of the bottle being guided by spaced guide bars 253 and 254 provided on the stationary table and extending between the spider 38 and the outfeed conveyor 41, or to the edge of the table. At the same time, the bottle contacting point 255 of arm 251 will be moved along the curved line 255a from the solid line position shown in Figure 5 to the dotted line position shown at 251a, and during such movement, the bottle at position G will be moved to position H, from which it may be moved by contact therewith of the next bottle moved from position G. Continuing their orbital movement from the dotted line positions 250a and 251a, respectively, the arms 250 and 251 will respectively move back along the curved lines 252b and 255b to the solid line positions of Figure 5, with the result that arm 251 will now be behind the bottle at position G and arm 250 will be in a position to contact with and move the bottle which has now been placed at position F by the rotation of the outfeed spider 38.

The operation of the pusher member 240 is so timed with respect to the spider 38 that the arm 250 will contact with the bottle moved to position F by the spider 38 at the proper moment to remove the bottle from the spider at a linear speed which is substantially the same as the linear speed at which the bottle has moved from the filling table, so that the bottle will move smoothly and without any sudden acceleration or deceleration. As the arm 250 is retracted from point 250a, just before it positions the bottle at position G, it will cause the bottle to be gradually brought to a stop at that position so that no jarring of the contents of the bottle will result.

In order to permit the positioning means to handle bottles of different sizes, the pusher member 240 may be disconnected from the element 241 and replaced by a pusher member having arms of suitable thickness to handle the size bottles being operated upon. For example, the pusher member 240 illustrated is of a size suited for relatively large bottles and if smaller bottles were operated upon, the pusher member then used would have its arms 250 and 251 of increased thickness at their bottle contacting sides so that the bottle placed at position F, for instance, would be pushed to a point concentric with position G so that its vertical axis will be in alignment with the vertical axis of the crowning head.

A bottle is occasionally broken beneath a crowning head due to defects in the glass of the bottle and a resultant inability to withstand crowning pressure. When a bottle is thus broken, large fragments may fall to the surface of the table 57 and be so arranged with respect to the guide members 253 and 254 that when the succeeding bottle is moved from position F in Figure 5 to position G, this bottle, upon contacting with such fragments, may fall over, resulting in further jamming of succeeding bottles.

Figure 6:
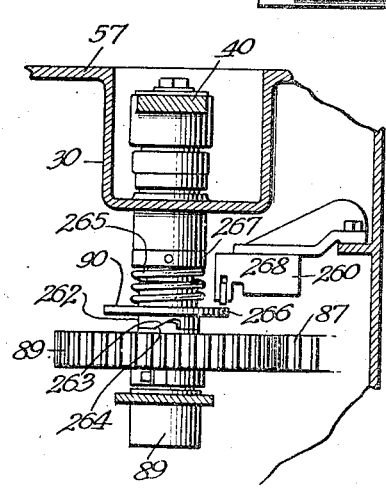
Figure 6 is a detail vertical sectional view taken on the line 6—6 of Figure 2 and showing the means associated with the crowner positioning means to stop the machine in case of a bottle being broken beneath the crowner.

Means is provided associated with the crowner positioning mechanism 40 to stop the operation of the entire machine whenever the movement of a bottle by this mechanism is resisted to any extent as would be the case if fragments impeded the movement of a bottle, this means comprising a cut-out switch 260 best shown in Figure 6. The switch 260 is normally in circuit closing position, but is moved to open circuit position by a spring clutch mechanism 90 associated with the shaft 89 and illustrated in Figures 2 and 6. The spring clutch 90 comprises a collar 262 keyed to the shaft 89, the collar being axially slidable on the shaft along the key. The collar is provided on its lower edge with a cut-out or depression 263, the forward edge of the cut-out being inclined as indicated in Figure 6. The cut-out 263 is normally held over and about a tooth 264 on an axial flange secured to or formed with the driving gear 88 of the positioning mechanism 40, the forward edge of the tooth 264 also being beveled to contact with the inclined surface of the cut-out 263. As has been set forth above, the gear 88 is not keyed to shaft 89.

The collar 262 is normally held in the position described by a coil spring 265 having its lower end bearing upon a flange 266 extending about the collar 262, the upper end of the spring bearing on a washer 267 secured to the shaft 89. When the collar 262 is in the position described, the flange 266 will be below and spaced from the operating element 268 of switch 260, as shown in Figure 6. The contacting member 268 is preferably in the form of a roller.

In the normal operation of the machine, the collar 262 will be in the downward position shown in Figure 6 and the drive to the crowner positioning means 40 will be from the gear 87 on the crowner operating shaft 60 to gear 88 and through the tooth 264 and cut-out 263 to the collar 262 keyed to the shaft 89, the contacting inclined portions of the tooth 264 and cut-out 263 being at such an angle with respect to each other that the positioning means will be properly driven. However, should the movement of the pusher member in moving a bottle from position F (Figure 5) to position G be resisted to even a very slight extent, as would occur in the event that a bottle came in contact with a fragment of a broken bottle, the drag thus imposed upon the pusher member 240 would retard its movement with respect to the constantly rotating pinion 88. As a result, the collar 262 will be forced upwardly on the shaft 89 as the inclined forward face of tooth 264 rides from beneath the inclined face of the cut-out 263 of collar 262. Collar 262 will thus move upwardly along the shaft 89 and against the action of the spring 265, bringing its flange 266 in contact with the circuit controlling element 268 of switch 260, so that switch 260 will be opened. The switch 260 is so arranged with respect to the wiring circuit of the machine that the movement of the same to open circuit position will cause the machine to be stopped, so that the attendant may remove the broken fragments of bottle from beneath the crowner 33. The upward movement of collar 262 required to open the switch 260 is so slight that the machine, suitably braked against overtravel, will stop before cut-out 263 entirely rides off the tooth 264 and when the obstacle holding pusher arm 240 is cleared, the spring 265 will tend the collar 262 to proper position with respect to the tooth 264. Because of this, the elements will always be properly timed with respect to each other.

The crowning mechanism

The crowning mechanism is best illustrated in Figures 2 to 4. As shown in Figure 2, the crowner drive shaft 60, driven as described in our said divisional application, is hollow and terminates at approximately the level of the working surface 57 of table 30. A shaft 275 extends upwardly from the hollow shaft 60, shaft 275 being slidably keyed in the shaft 60 and the upper portion of shaft 275 extending through the standard 277 which forms part of the supporting structure of the crowning mechanism. The upper portion 278 of the supporting structure of the crowning mechanism is vertically adjustable with respect to the lower portion or standard 277, being connected to the standard by means of a threaded connection comprising threads 279 on the standard 277 which are engaged by a split collar 280 having its bore threaded and which collar is provided with an upwardly extending and in-turned flange 281 which engages above a projecting flange 282 on the lower end of the upper element 278 of the crowner supporting structure.

The standard 277 extends upwardly into a chamber 283 in the upper member 278, the two being keyed together by a key block 284 carried by the upper member 278 and projecting into a longitudinal key-way 285 in the standard 277. The key block 284 may be held firmly in the keyway 285 by a threaded holding bolt 286. The solid shaft 275 is suitably channeled in the upper portion of upper supporting member 278. By the above arrangement, the upper supporting member 278 of the crowner, carrying the crowning head 288, may be raised or lowered with respect to the supporting standard 277 merely by loosening the split collar 280 and rotating it upon the threads 279 so that the upper member will be moved either upwardly or downwardly, rotation of the upper supporting member 278 being prevented by the key 284 during this operation. The key 284 will be slightly loosened during adjustment of the crowning mechanism, and when it is again tightened after adjustment, it will hold the two elements of the supporting structure firmly together so that there will be no vibration. The shaft 275 being journaled in the upper portion 278 of the crowner supporting structure will move upwardly or downwardly with that portion, a driving connection being maintained between the hollow shaft 60 and the shaft 275 through the key connection 276.

The crowning head 288 is reciprocable in the casting 278, being reciprocated by rotation of an annular cam 289 on the upper portion of the shaft 275.

Caps for use in the crowning operation are supplied to the crowning head 288 from the crown hopper 290 through a chute 291 of well known type. As best shown in Figure 4, the chute 291 is kept filled with caps and when the crowning head 288 is in lowered position, the end of the chute 291 will be closed by the side wall 292 of the crowning head. When the crowning head rises upon the completion of a crowning operation and after using the cap shown beneath the crowning plunger 294, the crowning chamber 293, which opens to the side wall 292 of the head, will be opposite the lower end of the chute 291 so that the lowermost cap in the chute may slide into the space 295 in the crowning chamber, moving the cap already there over beneath the crowning plunger. It will thus be observed that the crowning chamber will preferably hold two caps, one directly beneath the crowning plunger 294 and the other resting in the space 295 between the center of the crowning chamber and the outside wall 292.

In order to prevent the cap in the space 295 from being jarred from the crowning head during the crowning operation, the present head is provided with a closure plate 296 pivoted to the side wall 292 of the crowning head on a pin 296a. The plate 296 includes an upwardly projetcing portion 297 which is normally held opposite the open end of the crowning chamber 293 by a spring 298, the movement of the plate 296 by spring 298 being limited by a stop 299. The plate 296 will thus keep the open end of the crowning chamber space 295 closed. However, when the crowning head rises to position the space 295 opposite the chute 291, the chute will strike the plate 296, swinging it downwardly on its pivot 296a and against the action of the light spring 298. Another cap may thus slide into the space 295 and the caps in the chamber will be prevented from falling therefrom by the immediate rise of the plate 296.

It will be understood that if one of the caps should fall from the chamber, the cap which should be beneath the crowning plunger 294 may slide along the chamber so that it will not be centered beneath the plunger, with the result that when the crowning head descends upon a bottle, the cap will not be properly positioned upon the bottle. The provision of means to maintain the caps in the crowning head so that one cap will be directly in the alignment with the plunger is therefore of considerable importance.

Structure disclosed but not claimed herein is claimed in our above-mentioned divisional application filed May 6, 1940.

It will be understood that the invention is not limited to the details of construction shown in the drawings and that the examples of the use of the machine and mechanisms which have been given do not include all of the uses of which they are capable; and that the phraseology employed in the specification is for the purposes of description and not of limitation.

We claim:

1. In combination, a mechanism for performing an operation upon a container, a continuously moving member to move a container to said mechanism and simultaneously move another container from said mechanism, and means to stop operation of said mechanism when movement of said member is hindered.

2. The combination in a filling machine, of a container supporting element and a container engaging element, one of said elements being vertically movable with respect to the other, means to position containers in alignment with the movable element, leave the containers in such alignment, and then move the containers from between said elements, comprising an oscillatable pusher member, a rectilinearly slidable member, and a crank spaced from said last-named member, said pusher member having one end pivotally connected to said slidable member and its other end connected to said crank so that it will move in an oscillatory path.

3. In combination, a reciprocable crowning head including a crowning chamber open at one end thereof, a stationary chute arranged to supply a cap to said crowning chamber when the chamber is positioned opposite the chute during reciprocation of the head, and a plate pivotally mounted on said crowning head for movement in a plane transverse to the open end of the crowning chamber and arranged to close said opening during the remainder of the travel of said crowning head.

4. In combination, a base including a container supporting element, an element for performing an operation upon a container, one of said elements being vertically movable with respect to the other, guide means defining a path for the containers, a container engaging arm connected at one end to said base for reciprocable movement on a line at an angle to said path and for simultaneous swinging movement, and rotating means operatively connected to said arm at a point spaced from said end thereof to move the free end of said arm in an orbital path beneath said operation performing element.

5. In combination, a base including a container supporting element, an element for performing an operation upon a container, one of said elements being vertically movable with respect to the other, guide means defining a path for the containers, a member mounted on said base for reciprocation along a line at an angle to said path, a container engaging arm pivoted on said member, and rotatable means to swing said arm on its pivot and reciprocate said member to move the end of said arm adjacent said path through an orbital course to position containers beneath said operation performing element.

6. In combination, a base including a container supporting element, an element for performing an operation upon a container, one of said elements being vertically movable with respect to the other, guide means defining a path for the containers, a member mounted on said base for reciprocation along a line at an angle to said path, a double armed container engaging element pivoted on said member, and rotatable means to swing said element on its pivot and reciprocate said member to move the arms of said element in laterally displaced orbital paths beneath said operation performing element.

7. In combination, a base including a container supporting element, an element for performing an operation upon a container, one of said elements being vertically movable with respect to the other, guide means defining a path for the containers, a container engaging arm connected to said base for reciprocable movement on a line at an angle to said path and for simultaneous swinging movement, and rotating means operatively connected to said arm to move the free end thereof in an orbital path beneath said operation performing element.

8. In combination, a base including a container supporting element, an element for performing an operation upon a container, one of said elements being vertically movable with respect to the other, guide means defining a path for the containers, a member connected at one end to said base for reciprocable movement on a line at an angle to said path and for simultaneous swinging movement, said member being forked at its opposite and free end to provide a plurality of container contacting portions, and rotating means operatively connected to said member to move the free end thereof in an orbital path beneath said operation performing element.

9. In combination, a base including a container supporting element, an element for performing an operation upon a container, one of said elements being vertically movable with respect to the other, guide means defining a path for the containers, a container engaging arm connected at one end to said base for reciprocable movement on a line at an angle to said path and for simultaneous swinging movement, a driven shaft operatively connected to said arm, driving means, and means normally connecting said shaft and driving means adapted to disconnect the same when movement of said arm is impeded.

ROBERT J. STEWART.
HARRY J. REVER.